INVENTOR.
Dale R. Smith,
BY Paul & Paul
ATTORNEYS.

INVENTOR
Dale R. Smith,
BY
Paul & Paul
ATTORNEYS.

Dec. 5, 1967 D. R. SMITH 3,356,558

APPARATUS FOR APPLYING TEAR TAPE

Filed Feb. 14, 1964 5 Sheets-Sheet 3

INVENTOR.
Dale R. Smith,
BY
Paul & Paul
ATTORNEYS.

INVENTOR.
Dale R. Smith,
BY
Paul & Paul
ATTORNEYS.

APPARATUS FOR APPLYING TEAR TAPE

Filed Feb. 14, 1964 5 Sheets-Sheet 5

INVENTOR.
Dale R. Smith,
BY
Paul & Paul
ATTORNEYS.

United States Patent Office 3,356,558 Patented Dec. 5, 1967

3,356,558

APPARATUS FOR APPLYING TEAR TAPE

Dale R. Smith, Red Lion, Pa., assignor to York Production Engineering Company, Windsor, Pa., a corporation of Pennsylvania Filed Feb. 14, 1964, Ser. No. 345,016
9 Claims. (Cl. 156—519)

ABSTRACT OF THE DISCLOSURE

A web of wrapping material is passed over a stationary heating unit. A tape applying head with four tape applying faces is disposed over the heating unit. Trained over three of the tape applying faces is the leading end portion of a roll of tear tape material held to the tape applying faces by suction. The tape applying head is mounted upon a rock arm which lowers the head to apply a tear tape and then raises it again. Each time the head is raised it is turned through 90 degrees preparatory to the next cycle. After a tear tape is applied to the web of wrapping material and severed from the roll of tear tape material, suction is cut off to release the applied tear tape while the following portion of the tear tape is held to the head by suction.

This invention relates to apparatus for severing strips of sheet material from a continuous web thereof and feeding them to a utility.

A principal object of the invention is to provide apparatus for positively holding the leading portion of a continuous web of tear tape material until it is applied to a continuous web of wrapping material and then releasing the same while holding a trailing portion of the tear tape for the next cycle.

Another object is to provide such apparatus wherein each short length of the tear tape is applied to the wrapping material simultaneously throughout the length thereof.

Another object is to provide such apparatus wherein the tear tape is applied to one side of the wrapping material and heat to the other side to effect adhesion of the tear tape to the wrapping material.

Other objects of the invention will become apparent when the following description is read with reference to the accompanying drawings, in which.

Figure 1:
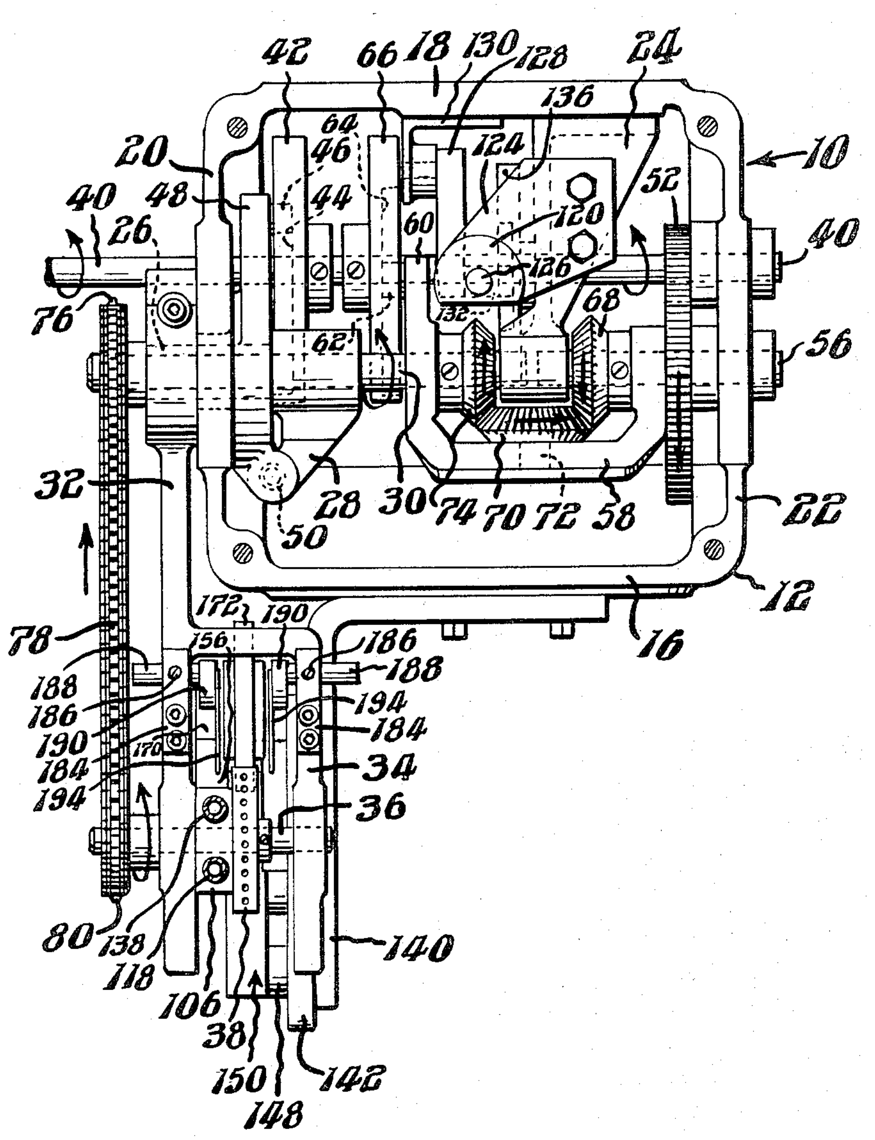
FIG. 1 is a plan view of apparatus constructed in accordance with the invention, the cover being removed to expose the interior thereof.
Figure 2:
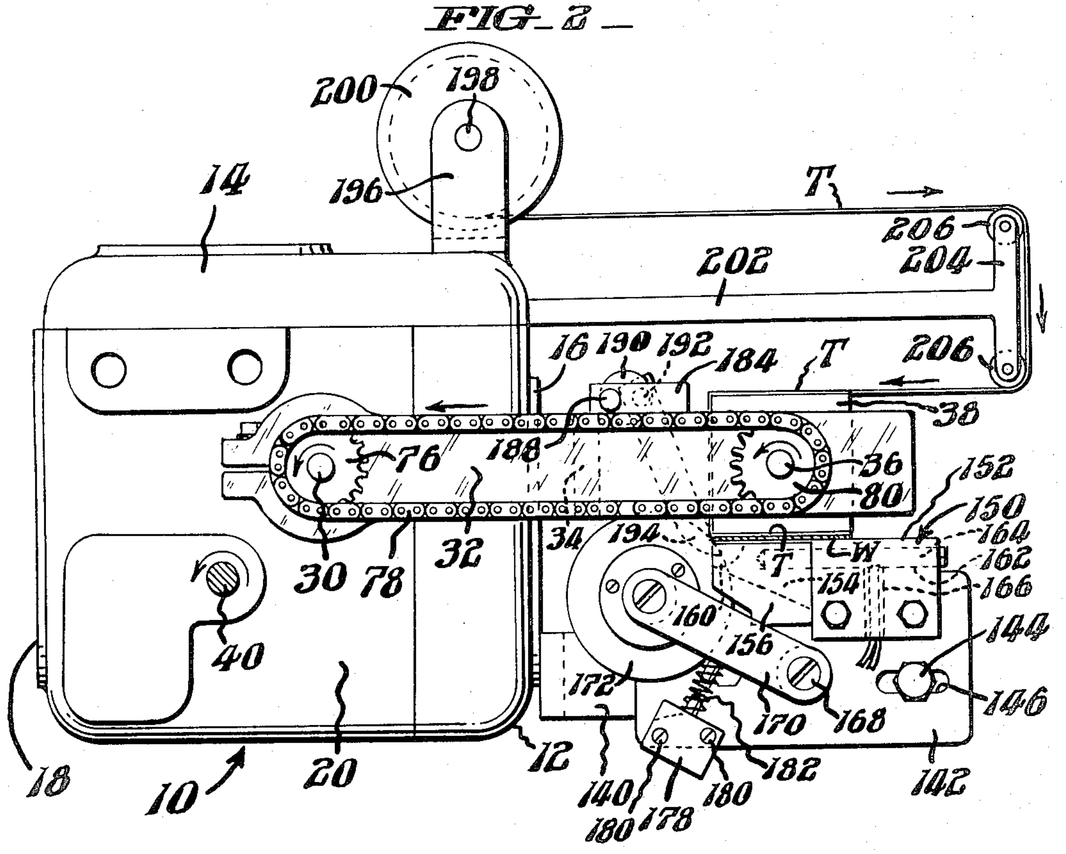
FIG. 2 is an end view of the apparatus shown in FIG. 1, with the cover in place.

The following description is directed to the specific form of the invention illustrated in the drawings and is not intended to be addressed to the scope of the invention, which may be practiced in a wide variety of forms.

Figure 3:
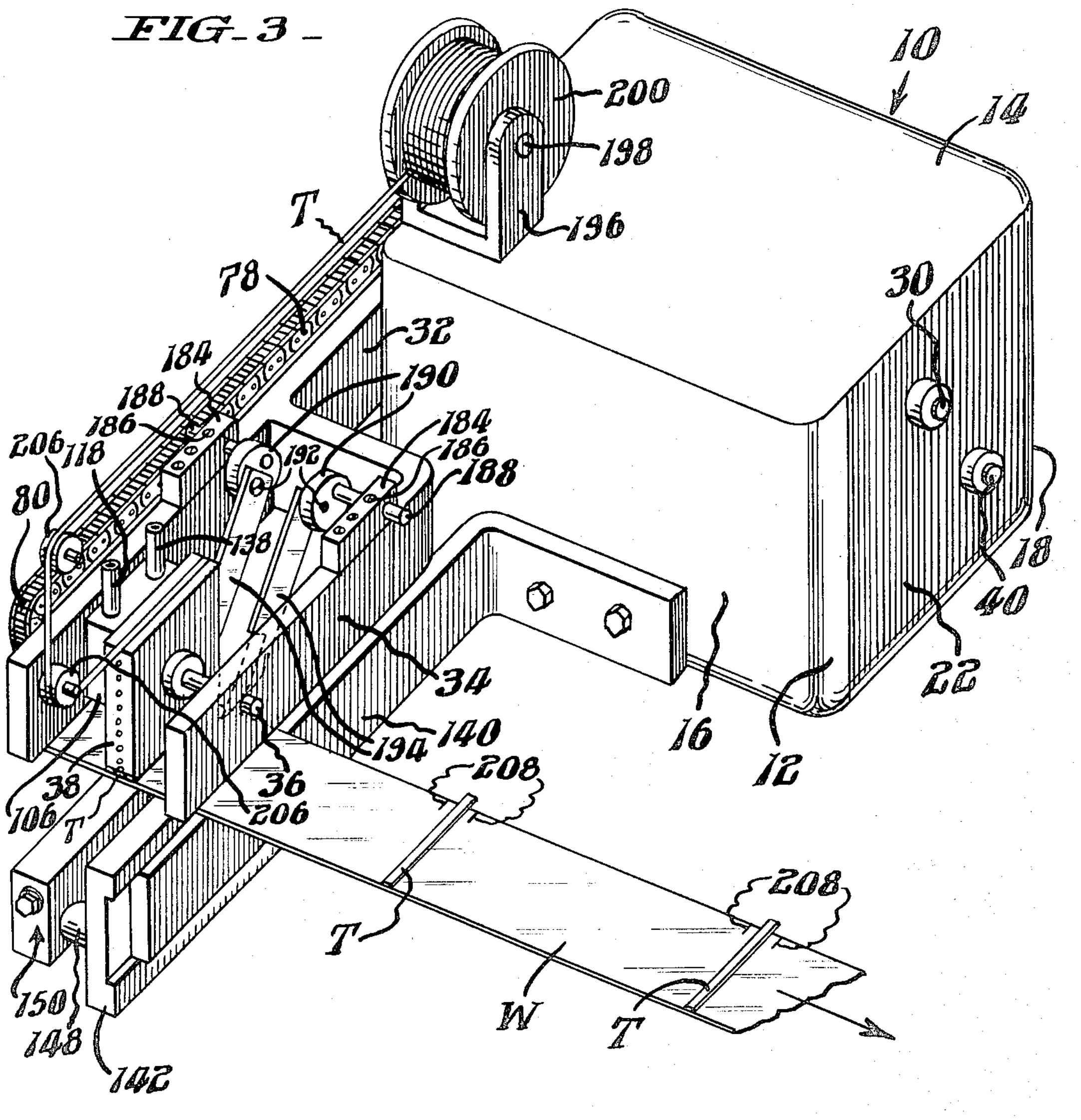
FIG. 3 is a perspective view of the apparatus.

Referring particularly to FIGS. 1 and 3, apparatus constructed in accordance with the invention includes a gear box 10 having a body 12 and a cover 14. The body 12 is provided with an upright front wall 16, an upright rear wall 18 and upright opposite end walls 20 and 22.

Extending forwardly from the rear wall 18 is a bracket 24. Projecting through the end wall 20 is the hub 26 of a lever 28. Journaled in the bracket 24 and the hub 26 is an output shaft 30. Affixed to the hub 26 is a rock arm 32 provided with a laterally offset branch 34. Journaled in the arm 32 and its branch 34 are longitudinally spaced portions of a shaft 36 upon which is affixed a tape applying head 38. Journaled in the opposite end walls 20 and 22 of the body 12 are longitudinally spaced portions of an input shaft 40. Affixed to the shaft 40 is a disc 42 in which is formed a cam track 44. Working in the cam track 44 is a pin 46 mounted on the end of a lever 48 which is pivotally mounted upon the hub 26 of the lever 28. Underlying the opposite end portion of the lever 48 is a spring 50 seated upon a free end portion of the lever 28.

Affixed to the input shaft 40 is a pinion 52 which meshes with a gear 54 mounted upon a shaft 56 coaxially related to the output shaft 30. Pivoted upon the shafts 56 and 30 is a U-shaped yoke 58, one leg of which is extended, as at 60. The extension 60 carries a pin 62 which works in a cam track 64 formed in a disc 66 affixed to the input shaft 40. Affixed to the shaft 56 is a bevel gear 68 meshing with a bevel gear 70 which rotates freely upon a pin 72 carried by the yoke 58. The bevel gear 70 meshes with a bevel gear 74 affixed to the output shaft 30.

Affixed to the opposite end of the output shaft 30 is a chain sprocket 76 about which is trained a chain drive 78. The chain 78 is also trained about a chain sprocket 80 affixed to the shaft 36.

Figure 6:
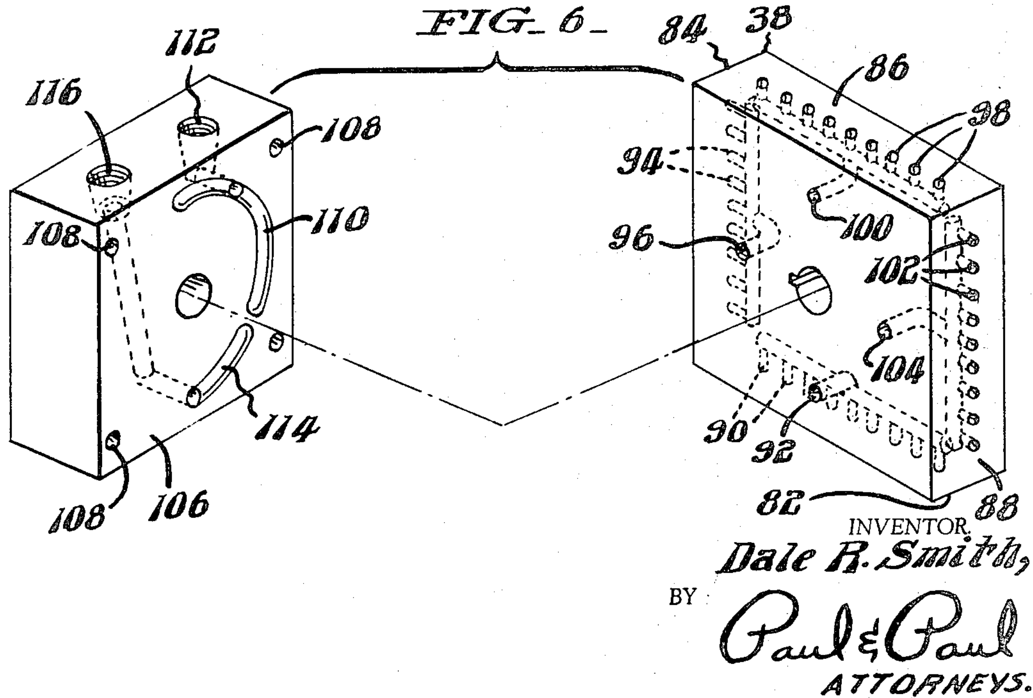
FIG. 6 is a perspective view showing the tape applying head and the associated valve alone and separated.

Referring particularly to FIG. 6, the tape applying head 38 is provided with a downwardly facing tape applying surface area 82, a rearwardly facing tape applying surface area 84, an upwardly facing tape applying surface area 86 and a forwardly facing tape applying surface area 88. Formed in the area 82 are a series of openings 90 communicating with an opening 92 in the side of the tape applying head. Formed in the area 84 are a series of openings 94 communicating with an opening 96 in the side of the tape applying head. Formed in the area 86 are a series of openings 98 communicating with an opening 100 in the side of the tape applying head, and formed in the area 88 are a series of openings 102 communicating with an opening 104 in the side of the tape applying head.

Disposed in side abutting relation to the tape applying head 38 is a valve block 106 which is affixed to the rock arm 32 by means of bolts projected through openings 108. On the face of the valve block presenting toward the tape applying head 38 is an arcuate groove 110 communicating with a threaded bore 112 and an arcuate groove 114 communicating with a threaded bore 116. The bore 116 is connected by a conduit 118 to a valve 120, which valve is connected to a source of vacuum by a conduit 122. The valve 120 is carried by a bracket 124, in turn carried by the bracket 24. The stem 126 of the valve 120 is pivotally connected by a link 128 to a bracket 130 affixed to the wall 18. Extending laterally from the valve stem is a pin 132 which works in a cam track 134 formed in a disc 136 affixed to the input shaft 40. The bore 112 in the valve block is connected by means of a conduit 138 directly to the conduit 122.

Extending forwardly from the front wall 16 is a bracket 140 over which is slidably fitted a channel member 142 secured to the bracket by means of a bolt 144 extending through a slot 146. Carried by the member 142 are a plurality of spacers 148 for a heating unit 150.

Referring particulaly to FIG. 2 and FIGS. 7 to 10, inclusive, the heater unit 150 is provided with a body 152 which has a tongue 154 feathering rearwardly to a sharp terminal edge 155. The tongue 154 is embraced by a U-shaped member 156, leaving a space 158 on each side of the tongue. Each leg of the U-shaped member 156 is grooved, as at 160, for a purpose to appear. The body of the heater is provided with a bore 162 for a heating element 164 and with a bore 166 for wires leading to the heating element.

The member 142 carries a pivot 168 for a link 170 mounting a nylon roller 172 which extends forwardly freely between the legs of the member 156 and is disposed directly behind the tongue 154. Affixed to the plate 142 is a block 178 secured by means of screws 180, and interposed between the block 178 and the link 170 is a compression spring 182 biasing the roller 172 toward the edge 155.

The rock arm 32 and its branch 34 each have affixed thereto a block 184 through which extends a pin 188 secured by a screw 186 and mounting an eccentric 190. Pinned to the eccentric 190, as at 192, is a knife 194.

Seated upon the cover 14 is a U-shaped bracket 196 carrying a pin 198. Mounted on the pin 198 is a spool 200. Extending forwardly from the cover 14 is a bracket 202 at the end of which is a vertically extending crossarm 204 at opposite end portions of which are mounted rollers 206.

In the operation of the apparatus, suitable mechanism (not shown) constantly rotates the input shaft 40 and intermittently moves a continuous web of wrapping material W through a tape applying station, i.e., over the heating unit 150, in predetermined timed relation.

As disc 42 turns, pin 46 works in cam track 44 and rocks lever 48 about hub 26 of lever 28, and through the spring 50, lever 48 rocks lever 28 and its hub 26 about the output shaft 30. Thus the arm 32 and its branch 34 are rocked up and down. Cam track 44 is so formed that the tape applying head 38 is lowered to tape applying position, then after a brief period sufficient to apply a tear tape, it is raised again.

As pinion 52 turns, it rotates gear 54, shaft 56 and bevel gear 68. Bevel gear 68 rotates bevel gear 70 and bevel gear 70 rotates bevel gear 74, output shaft 30 and chain sprocket 76. Chain sprocket 76 actuates chain 78, which turns chain sprocket 80, shaft 36 and tape applying head 38.

As disc 66 turns, pin 62 works in cam track 64 and rocks yoke 58.

The ratio of pinion 52 to gear 54 is 1:4 and the ratio of the bevel gears 68, 72 and 74 is 1:1:1. The arrangement is such that the output shaft makes one-quarter of a revolution to one revolution of the input shaft. The ratio of sprockets 76 and 80 is 1:1. Therefore, the tape applying head 38 turns ninety degrees for each revolution of the input shaft.

Figure 4:
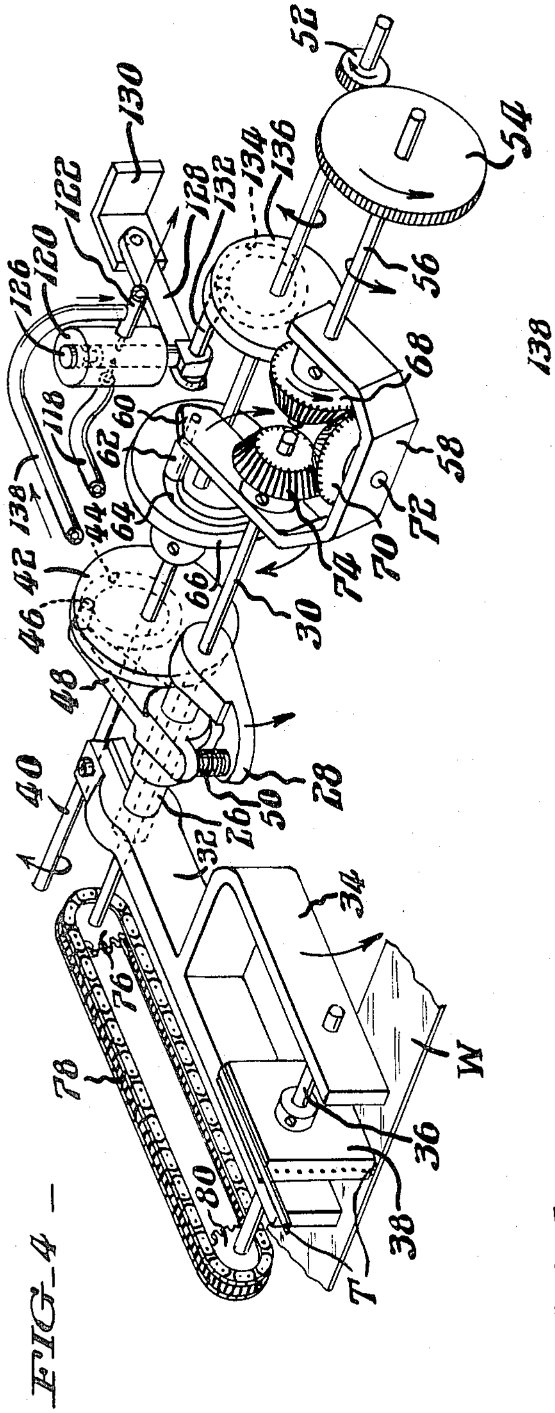
FIG. 4 is a perspective view of the apparatus, parts being omitted for the sake of clarity, showing the tape applying head lowered.
Figure 5:
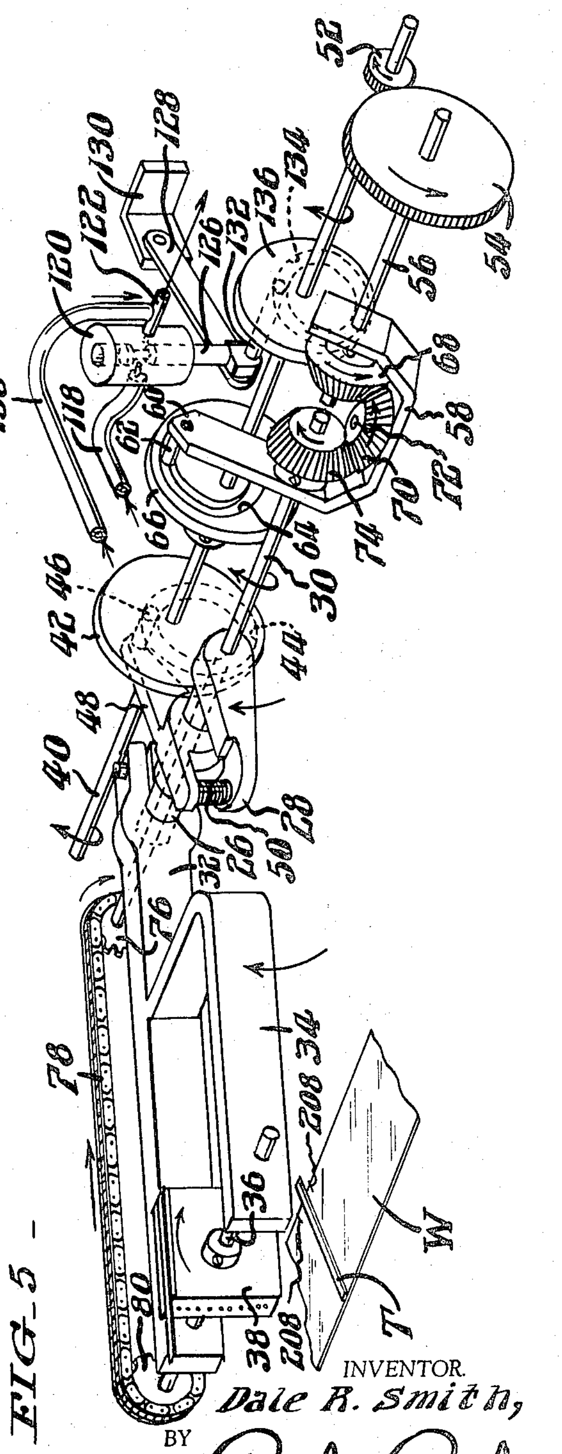
FIG. 5 is similar to FIG. 4, but shows the tape applying head raised.
Figures 7, 8, 9, 10:
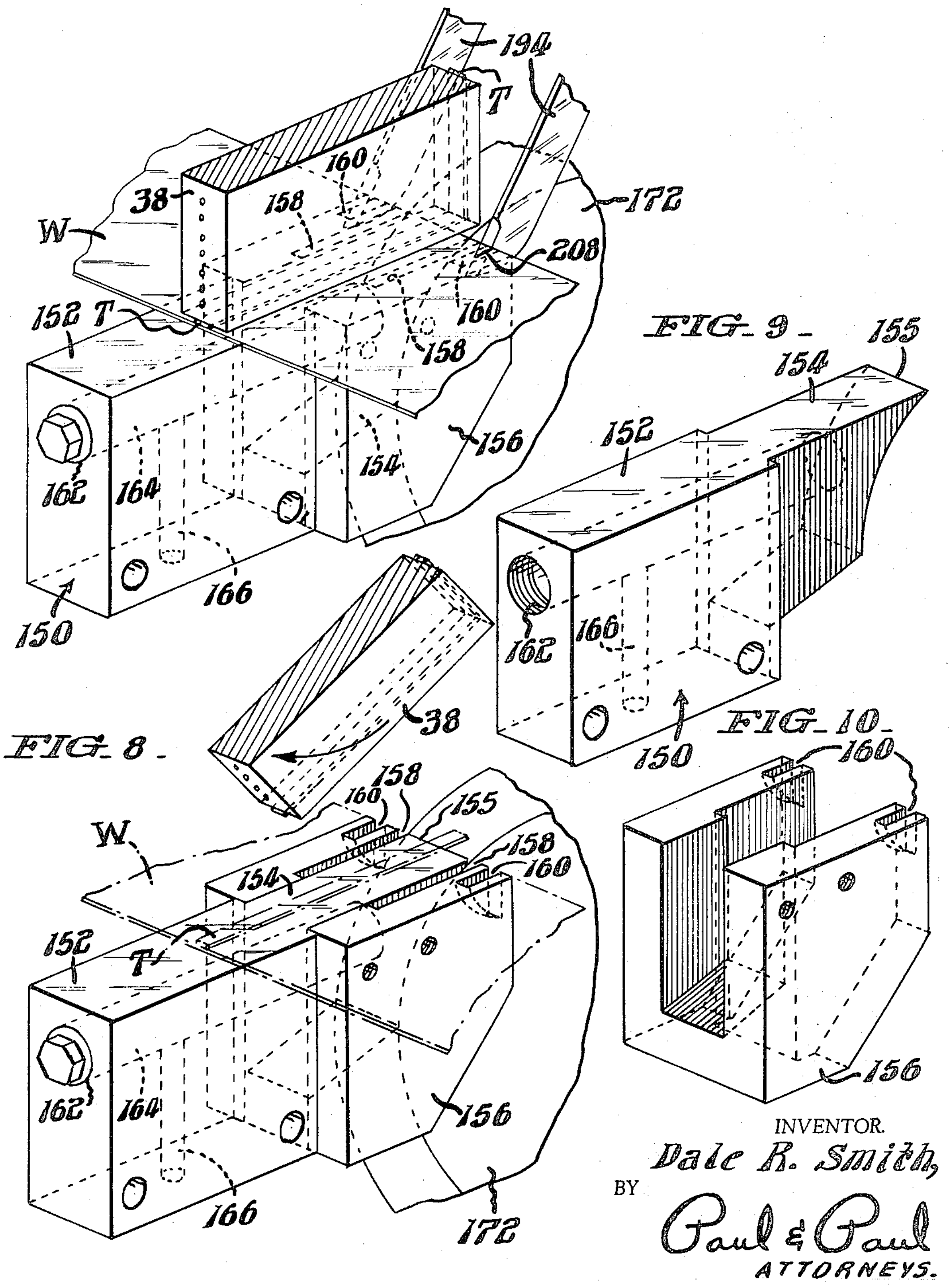
FIG. 7 is a perspective view showing the tape applying head lowered over a heating unit and applying a tear tape to the web of wrapping material.
FIG. 8 is a perspective view similar to FIG. 7, but showing the tape applying head raised.
FIG. 9 is a perspective view of the body of the heating unit.
FIG. 10 is a perspective view of a heater part.

FIG. 5 shows the tape applying head in raised position. When the yoke pivots from the position of FIG. 5 to that of FIG. 4, the bevel gear 70 walks about the bevel gear 74, turning about its own axis in the direction opposite to that in which it is driven by bevel gear 68. Therefore bevel gear 74 does not turn. When the yoke pivots back from its position of FIG. 4 to that of FIG. 5, the bevel gear 70 walks about bevel gear 74 in the opposite direction, turning about its own axis in the direction it is driven by bevel gear 68. Therefore bevel gear 74 is turned ninety degrees at an accelerated rate. Thus the tape applying head 38 is turned ninety degrees.

A continuous web of tear tape T from spool 200 is trained over rollers 206 and tape applying surface areas 86, 84 and 82 of the tape applying head 38. The leading tape portion is held to the downwardly facing tape applying surface area 82 by vacuum applied thereto through openings 90 communicating with groove 114 in the valve block 106. The next following trailing tape portion is held to the rearwardly facing tape applying surface area 84 by vacuum applied thereto through openings 94 communicating with groove 110 in the valve block 106. The next following trailing tape portion is held to the upwardly facing tape applying surface area 86 by vacuum applied thereto through openings 98 communicating with groove 110 in the valve block 106. The forwardly facing tape applying surface area 88 is not connected to vacuum.

During each cycle, head 38 is turned ninety degrees, while it is in raised position, to feed tape T for the next cycle. Rearwardly and downwardly facing tape applying surface areas 84 and 82 substantially always are in communication with vacuum. As rearwardly facing surface area 84 turns to downwardly facing position 82 it is connected to vacuum, which is finally cut off by valve 120 after the head 34 descends and applies the leading tape portion to the wrapping material. Two separate grooves 110 and 114, instead of only one groove, are formed in the valve block to make possible the vacuum cutoff. Stem 126 of the valve is moved up and down by pin 132 working in cam track 134 of disc 136 on input shaft 40.

When tape applying head 38 reaches tape applying position, the web of wrapping material W is stationary. Thereupon the leading tape portion is pressed onto web W. Adhesion of the tape to web W is effected by the heat applied to the web W and through the latter to the tape by the heater 150.

As the rock arm 32 and its branch 34 descend for the tape applying operation, the knives 194 slit the web on both sides of the applied tape, as at 208. It will be noted that the knives may be moved laterally relative to each other in order to suitably space the slits 208. It will also be noted that the knives may be adjusted by means of the eccentrics in order to provide slits of suitable length. The points of the knives, it will be noted, pass through the grooves 160 formed in the legs of the member 156.

When the tape applying head 38 descends, its edge at the lower rear corner thereof coacts with the face of the nylon roller 172 to pinch the tape and thereby sever the leading tape portion from the trailing tape portion.

What is claimed is:

1. In apparatus for applying tear tape to wrapping material, the combination comprising means providing a stationary surface area over which a continuous web of wrapping material may be advanced, a rock arm, a tape applying head revolvably mounted upon the end of said arm and overlying said stationary surface, said head being provided with leading and trailing tape applying surface areas, means for holding leading and trailing portions of a continuous web of tear tape respectively to said leading and trailing tape applying surface areas, and means operative in each cycle for bringing said leading tape applying surface area to bear upon said stationary surface area thereby to press said leading tape portion onto the wrapping material to effect adhesion thereto, severing said leading tape portion from said trailing tape portion, releasing the hold of said leading tape applying surface area upon said leading tape portion while continuing the hold of said trailing tape applying surface area upon said trailing tape portion, and turning said tape applying head to feed said tape and position the same for the next cycle including an input shaft adapted to rotate continuously, means operatively interposed between said shaft and rock arm for rocking said arm, and means interposed between said shaft and tape applying head for rotating the latter in predetermined timed relation to rocking of said arm.

2. The combination defined in claim 1 wherein the means interposed between the input shaft and rock arm includes means for yieldably rocking said arm into tape applying position.

3. The combination defined in claim wherein the means interposed between the input shaft and tape applying head includes a lost motion device.

4. In apparatus for applying tear tape to wrapping material, the combination comprising a stationary unit providing a heated surface area over which a continuous web of wrapping material may be advanced, a tape applying head overlying said heated surface area and having leading and trailing tape applying surface areas each adapted to extend across said wrapping material, means for holding leading and trailing portions of a continuous web of tear tape respectively to said leading and trailing tape applying surface areas, and means operative in each cycle for bringing said leading tape applying surface area to bear upon said heated surface area thereby to press said leading tape portion onto the wrapping material to effect adhesion thereto, severing said leading tape portion from said trailing tape portion, releasing the hold of said leading tape applying surface area upon said leading tape portion while continuing the hold of said trailing tape applying surface area upon said trailing tape portion, and advancing said tape applying surface areas to feed said tape and position the same for the next cycle including a member coacting with said tape applying head and unit to pinch said tear tape at the juncture of the leading and trailing tape portions whereby to sever the same.

5. The combination defined in claim 4 wherein the member coacting with the tape applying head and unit is yieldably mounted, and said member and tape applying head are adapted for engaging the tape respectively upon opposite sides thereof.

6. In apparatus for applying tear tape to wrapping material, the combination comprising means providing a stationary surface area over which a continuous web of wrapping material may be advanced, a rock arm, a tape applying head revolvably mounted upon the end of said arm and overlying said stationary surface, said head being provided with leading and trailing tape applying surface areas, means for holding leading and trailing portions of a continuous web of tear tape respectively to said leading and trailing tape applying surface areas, and means operative in each cycle for bringing said leading tape applying surface area to bear upon said stationary surface area thereby to press said leading tape portion onto the wrapping material to effect adhesion thereto, slitting the edge of said wrapping material on each side of said tape, severing said leading tape portion from said trailing tape portion, releasing the hold of said leading tape applying surface area upon said leading tape portion while continuing the hold of said trailing tape applying surface area upon said trailing tape portion, and turning said tape applying head to feed said tape and position the same for the next cycle including a pair of laterally spaced knives adjustably mounted upon said rocker arm for slitting said wrapper material when said tape applying head is moved into tape applying position.

7. In apparatus for successively severing strips of sheet material from a continuous web thereof and feeding them to a utility, the combination comprising a rock arm, a strip applying head revolvably mounted upon the end of said arm and overlying said utility, said head being provided with leading and trailing strip applying surface areas, means for holding leading and trailing portions of said continuous web of sheet material respectively to said leading and trailing strip applying surface areas, and means operative in each strip applying cycle of the apparatus for bringing said leading strip applying surface area to bear upon said utility, severing a strip from said web by severing said web between said leading and trailing web portions, releasing the hold of said leading strip applying surface area upon said strip while continuing the hold of said trailing strip applying surface area upon said trailing web portion, and turning said strip applying head to feed said web and position the same for the next cycle of the apparatus including an input shaft adapted to rotate continuously, means operatively interposed between said shaft and rock arm for rocking said arm, and means interposed between said shaft and tape applying head for rotating the latter in predetermined timed relation to rocking of said arm.

8. Apparatus according to claim 1 characterized in that the leading and trailing tape applying surface areas of said tape applying head meet at a sharp corner junction, and in that said means for severing the leading tape portion from the trailing tape portion comprises a member adapted to be engaged by said corner junction when said tape applying head is rotated, for applying severing pressure on the tape positioned therebetween.

9. Apparatus according to claim 5 characterized in that the leading and trailing tape applying surface areas of said tape applying head meet at a sharp corner junction, further characterized in that said means for advancing said tape applying surface areas to feed said tape include indexing means for rotating said tape applying head at timed intervals, and still further characterized in that said member coacting with said tape applying head to sever said tape comprises a roller positioned to be engaged by the corner junctions when said tape applying head is rotated, for applying severing pressure on the tape positioned therebetween.

References Cited

UNITED STATES PATENTS

| | | | |
|---|---|---|---|
| 2,483,458 | 10/1949 | Fischer et al. | 156—521 |
| 2,543,004 | 2/1951 | Dewyer | 156—519 |
| 2,990,081 | 6/1961 | De Neui | 156—519 |
| 3,146,152 | 8/1964 | Seragnoli | 156—519 |

DOUGLAS J. DRUMMOND, *Primary Examiner.*